(12) United States Patent
Wong et al.

(10) Patent No.: US 10,647,347 B2
(45) Date of Patent: May 12, 2020

(54) POWER STEERING GEAR ASSEMBLY HAVING AN END OF TRAVEL VALVE ASSEMBLY

(71) Applicant: Steering Solutions IP Holding Corporation, Saginaw, MI (US)

(72) Inventors: Albert C. Wong, Saginaw, MI (US); Thomas C. Rytlewski, Auburn, MI (US); Jason A. Dutsky, Bay City, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 125 days.

(21) Appl. No.: 15/853,526

(22) Filed: Dec. 22, 2017

(65) Prior Publication Data

US 2018/0118255 A1 May 3, 2018

Related U.S. Application Data

(63) Continuation-in-part of application No. 15/280,056, filed on Sep. 29, 2016, now abandoned.

(51) Int. Cl.
*B62D 5/06* (2006.01)
*B62D 5/12* (2006.01)
(Continued)

(52) U.S. Cl.
CPC .............. *B62D 5/061* (2013.01); *B62D 5/12* (2013.01); *F15B 15/1447* (2013.01);
(Continued)

(58) Field of Classification Search
CPC ...... F15B 15/222; F15B 15/225; F15B 15/24; F15B 13/0402; F15B 13/0405; B62D 5/06; B62D 5/061; B62D 5/087; B62D 5/09
(Continued)

(56) References Cited

U.S. PATENT DOCUMENTS 1,045,956 A * 12/1912 Demmler ................ B22C 15/10
164/206
2,412,975 A * 12/1946 Dunnebeck ........... F15B 15/222
91/395
(Continued)

FOREIGN PATENT DOCUMENTS

| DE | 2245129 | 3/1974 |
|---|---|---|
| DE | 2249181 A1 | 4/1974 |
| WO | 3700811 A1 | 2/1987 |

*Primary Examiner* — Anne Marie M Boehler
(74) *Attorney, Agent, or Firm* — Dickinson Wright PLLC

(57) ABSTRACT

A self-setting valve assembly for a power steering gear assembly includes a plug, a first plunger, a second plunger, and a biasing member. The plug extends between a first end and a second end. The plug defines a cavity that is disposed between the first end and the second end, a first bore that extends from the first end to the cavity, and a second bore that extends from the second end to the cavity. The first plunger has a first head that is disposed within the cavity and a first stem that extends from the first head through the first bore. The second plunger has a second head that is disposed within the cavity and a second stem that extends from the first head through the second bore. The biasing member is disposed within the bore and extending between the first head and the second head.

9 Claims, 8 Drawing Sheets

(51) Int. Cl.
  *F15B 15/22* (2006.01)
  *F15B 15/24* (2006.01)
  *F15B 15/14* (2006.01)
  *F16K 15/18* (2006.01)
  *F15B 15/20* (2006.01)

(52) U.S. Cl.
  CPC ........... *F15B 15/149* (2013.01); *F15B 15/204* (2013.01); *F15B 15/225* (2013.01); *F16K 15/183* (2013.01)

(58) Field of Classification Search
  USPC .............. 180/428; 74/388; 91/401, 395, 400
  See application file for complete search history.

(56) References Cited

U.S. PATENT DOCUMENTS

| | | | |
|---|---|---|---|
| 2,948,263 A * | 8/1960 | Royer | B64C 11/385 |
| | | | 91/401 |
| 3,315,570 A | 4/1967 | Brewer et al. | |
| 3,416,406 A * | 12/1968 | McCreery | B66B 9/04 |
| | | | 91/27 |
| 4,243,106 A * | 1/1981 | Skubich | E02F 3/844 |
| | | | 172/812 |
| 4,261,248 A | 4/1981 | Elser et al. | |
| 4,729,283 A | 3/1988 | Hillier | |
| 4,773,303 A | 9/1988 | Stroud | |
| 5,322,142 A | 6/1994 | Elser | |
| 5,419,235 A | 5/1995 | Gilbert et al. | |
| 5,562,017 A | 10/1996 | Wuenscher | |
| 2004/0251075 A1 | 12/2004 | Ishikawa et al. | |

* cited by examiner

POWER STEERING GEAR ASSEMBLY HAVING AN END OF TRAVEL VALVE ASSEMBLY

CROSS-REFERENCES TO RELATED APPLICATIONS

This patent application is a continuation-in-part of to U.S. patent application Ser. No. 15/280,056, filed Sep. 29, 2016, which is incorporated herein by reference in its entirety.

BACKGROUND

A power steering gear assembly is provided with a hydraulic pump that is configured to provide hydraulic power assist to a driver and a vehicle wheel. The power steering gear assembly is configured to stroke between axial stops or end of travel stops. As the power steering gear assembly approaches at least one of the end of travel stops, the hydraulic pump may be operating at pressure relief and the hydraulic power may be converted to heat and thus increase the working fluid temperature within the hydraulic pump. The increase in the working fluid temperature may cause high power consumption.

SUMMARY

According to an embodiment of the present disclosure, a self-setting valve assembly for a power steering gear assembly is provided. The self-setting valve assembly includes a first plug, a second plug, a first plunger, a second plunger, and a washer. The first plug extends between a first end and a second end. The first plug defines a first plug first cavity that extends from the second end towards the first end, a first bore that extends from the first end towards the second end, and a first plug second cavity that extends between the first plug first cavity and the first bore. The second plug is received within the first plug first cavity. The second plug defines a second plug first cavity and a second bore. The first plunger has a first head disposed within the first plug second cavity and a first stem that extends from the first head and through the first bore. The second plunger has a second head disposed within the second plug first cavity and a second stem that extends from the second head and through the second bore. The washer is received within the first plug first cavity and is disposed between the first plunger and the second plunger. The washer defines a central opening and another opening that extends from the central opening towards a periphery of the washer.

According to another embodiment of the present disclosure, a self-setting valve assembly for a power steering gear assembly is provided. The self-setting valve assembly includes a plug, a first plunger, a second plunger, and a biasing member. The plug extends between a first end and a second end. The plug defines a cavity that is disposed between the first end and the second end, a first bore that extends from the first end to the cavity, and a second bore that extends from the second end to the cavity. The first plunger has a first head that is disposed within the cavity and a first stem that extends from the first head through the first bore. The second plunger has a second head that is disposed within the cavity and a second stem that extends from the first head through the second bore. The biasing member is disposed within the bore and extending between the first head and the second head.

According to yet another embodiment of the present disclosure, a self-setting valve assembly for a power steering gear assembly is provided. The self-setting valve assembly includes a plug, a first plunger, a second plunger, and a biasing member. The plug defines a first bore that extends from a first end towards a first valve seat, a first cavity that extends from the first valve seat to an end wall, and a second cavity that extends from a second end to the end wall. The first plunger has a first head that is disposed within the first cavity and a first stem that extends from the first head and through the first bore. The first head defines a first cup. The second plunger has a second head that is disposed within the second cavity and a second stem that extends from the second head towards the second end of the plug. The second head defines a second cup. The biasing member has a first end received within the first cup and a second end received within the second cup.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, it is to be understood that the disclosed embodiments are merely illustrative of the invention that is embodied in various and alternative forms. The figures are not necessarily to scale; some features are exaggerated or minimized to show details of particular components. Therefore, specific structural and functional details disclosed herein are not to be interpreted as limiting, but merely as a representative basis for teaching one skilled in the art to variously employ the present invention.

Figure 1:
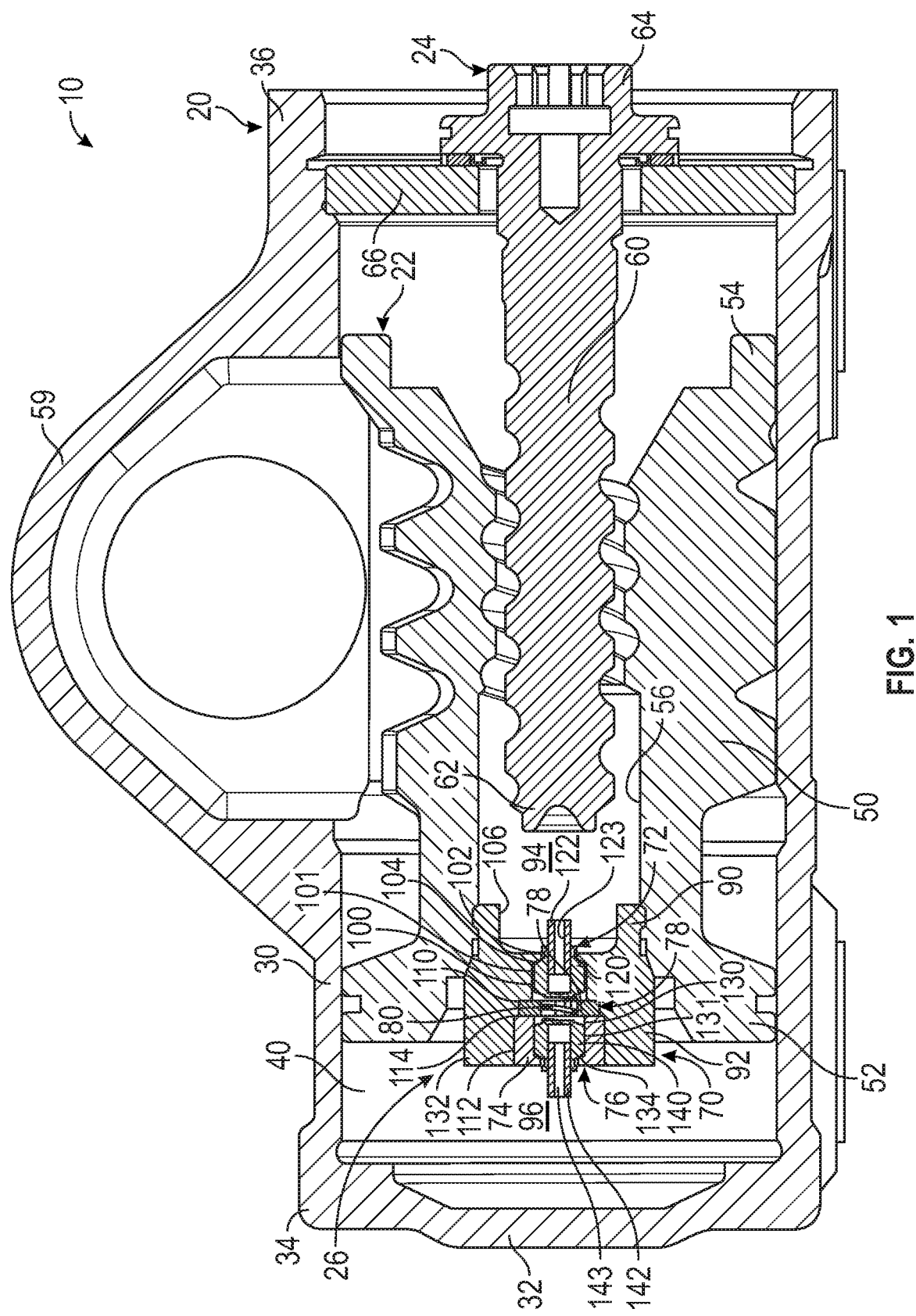
FIG. 1 is a cross-sectional view of a portion of power steering gear assembly having a valve assembly.

Referring to FIG. 1 a cross-sectional view of a power steering gear assembly 10 is shown. The power steering gear assembly 10 is provided with a vehicle such as an automobile, a truck, or the like. The power steering gear assembly 10 is configured to provide a power assist to an operator of the vehicle to turn or pivot steerable wheels of the vehicle. The power steering gear assembly 10 is configured to move along a steering stroke having stops or end of travel stops at opposite ends of a steering rack or the like.

The power steering gear assembly 10 includes a gear housing 20, a hydraulic cylinder 22, a ball screw 24, and an end of travel valve assembly 26. The gear housing 20 is disposed generally parallel to the steering stroke of the piston. The gear housing 20 includes a housing body 30 and an end wall 32. The housing body 30 extends between the first housing end 34 and a second housing end 36. The end wall 32 is disposed at the first housing end 34 and is disposed substantially perpendicular to the steering stroke of the piston. The housing body 30 and the end wall 32 define a cavity 40 that is configured to receive the hydraulic cylinder 22.

The hydraulic cylinder 22 is provided as part of a hydraulic gear. The hydraulic cylinder 22 includes a cylinder body 50 that extends between a first cylinder end 52 and a second cylinder end 54. The first cylinder end 52 is disposed proximate the first housing end 34. The cylinder body 50 defines a bore 56 that extends from the first cylinder end 52 towards the second cylinder end 54. The bore 56 extends completely through the cylinder body 50 such that the first cylinder end 52 and the second cylinder end 54 are each open ends.

The cylinder body 50 further defines a body opening 58 (see FIG. 3) and a lobe 59. The body opening 58 is disposed between the first cylinder end 52 and the second cylinder end 54. The body opening 58 is disposed substantially transverse to the first cylinder end 52 and the second cylinder end 54. The lobe 59 extends away from the first cylinder end 52 and the second cylinder end 54 and is disposed between the first cylinder end 52 and the second cylinder end 54.

The ball screw 24 is received within the cavity 40 of the gear housing 20. The ball screw 24 extends at least partially into the bore 56 of the hydraulic cylinder 22. The ball screw 24 has a ball screw body 60 that extends from a first ball screw end 62 towards a second ball screw end 64. The first ball screw end 62 is disposed proximate the first cylinder end 52 of the hydraulic cylinder 22. The second ball screw end 64 is disposed proximate the second housing end 36 of the gear housing 20. The second ball screw end 64 is configured to be operatively connected to an input shaft that is configured to cause the hydraulic cylinder 22 to move relative to the ball screw 24. The rotation of at least one of the hydraulic cylinder 22 and the ball screw 24 causes the hydraulic cylinder 22 to move between the first housing end 34 (see FIG. 3) and the second housing end 36 (see FIG. 4).

The end wall 32 of the gear housing 20 defines a first end of travel stop of the power steering gear assembly 10. An end plate 66 that is disposed proximate the second ball screw end 64 and is operatively connected to the gear housing 20 proximate the second housing end 36 defines a second end of travel stop of the power steering gear assembly 10.

The end of travel valve assembly 26 is configured as an end of travel stop valve that releases fluid pressure within the power steering gear assembly 10. The end of travel valve assembly 26 prevents the hydraulic pump from operating at pressure relief. The end of travel valve assembly 26 allows fluid circulating through the gear housing 20, the hydraulic cylinder 22, the gear, hoses, cooler, reservoir, and hydraulic pump to be released to keep the operating temperature low. The end of travel valve assembly 26 is at least partially received within the hydraulic cylinder 22. The end of travel valve assembly 26 is configured as a self-setting valve assembly or a self-adjusting valve assembly that enables tight sealing and its simple design enables the cost of the end of travel valve assembly 26 to be low. The end of travel valve assembly 26 is disposed proximate the first cylinder end 52 of the hydraulic cylinder 22. The end of travel valve assembly 26 is configured as a pressure unloading valve that enables fluid communication between opposite sides of the end of travel valve assembly 26 in response to the hydraulic cylinder 22 of the power steering gear assembly 10 approaching or achieving the first end of travel stop (i.e. the end wall 32) and or the second end of travel stop (i.e. the end plate 66). The fluid communication between opposite sides of the end of travel valve assembly 26 release hydraulic pressure to reduce pressure within the gear housing 20 of the power steering gear assembly 10.

Figure 4:
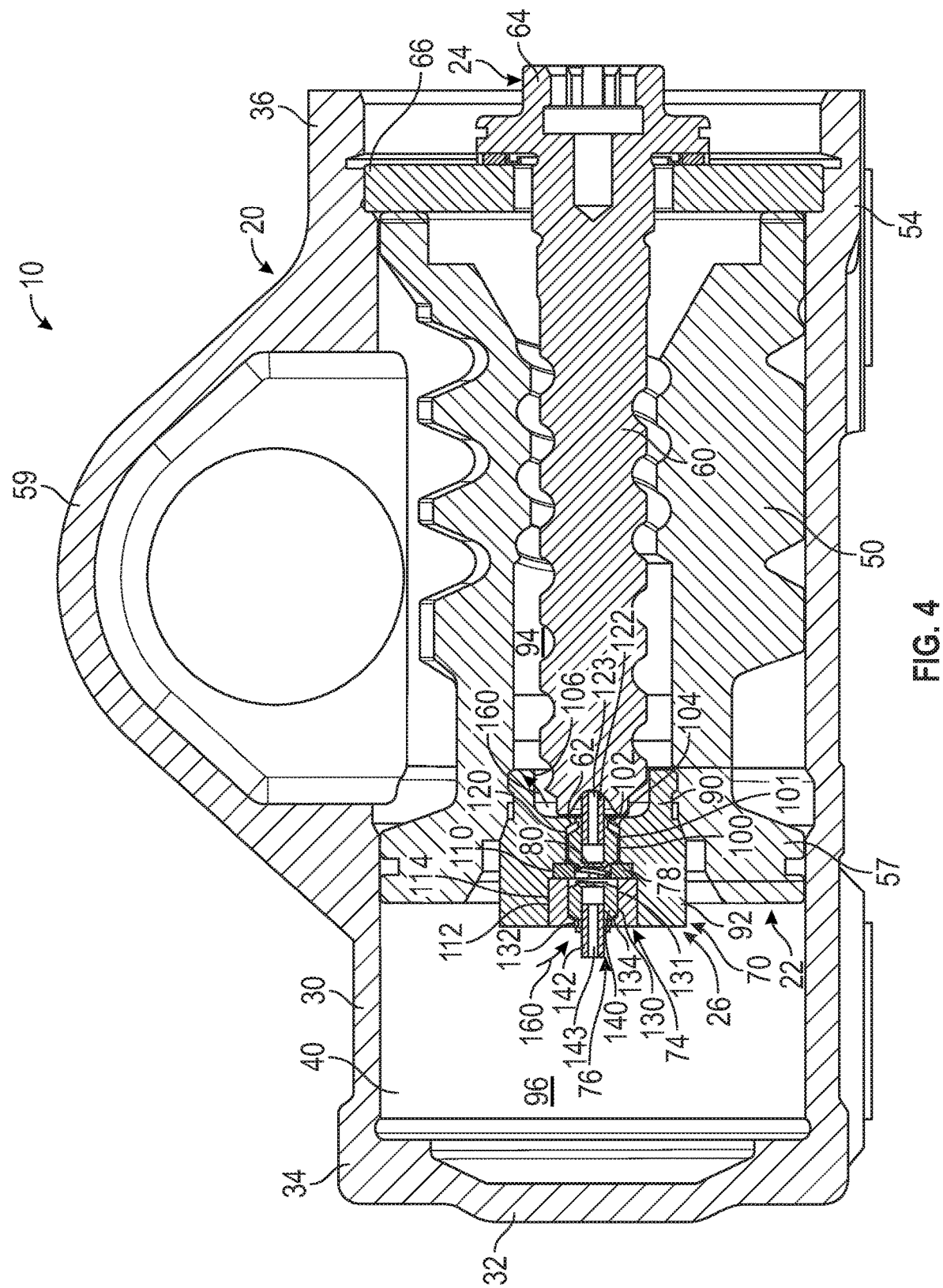
FIG. 4 is a cross-sectional view of the power steering gear assembly at a second end of travel.

Referring to FIG. 4, the end of travel valve assembly 26 includes a plug 70, a first plunger assembly 72, a sleeve 74, a second plunger assembly 76, a washer 78, and a biasing member 80. The plug 70 is operatively connected to the first cylinder end 52 of the hydraulic cylinder 22.

The plug 70 includes a first portion 90 and a second portion 92 extending from the first portion 90. The plug 70 of the end of travel valve assembly 26 divides or defines a first chamber 94 and the second chamber 96. The first chamber 94 is defined by the first portion 90 of the plug 70, the first ball screw end 62, and at least a portion of the bore 56 of the hydraulic cylinder 22. The second chamber 96 is defined by a second portion 92 of the plug 70, the end wall 32 of the gear housing 20, and at least a portion of the cavity 40 of the gear housing 20.

The first portion 90 extends at least partially into the bore 56 of the hydraulic cylinder 22. The first portion 90 defines a first cavity 100, a first plug opening 102, a first valve seat 104, and a first receiving region 106. The first cavity 100 has a first diameter and a first bore 101. The first plug opening 102 has a second diameter that is less than the first diameter. The first valve seat 104 extends between the first cavity 100 and the first plug opening 102. The first plug opening 102 is disposed between the first cavity 100 and the first receiving region 106. The first receiving region 106 is configured to at least partially receive the first ball screw end 62 while the hydraulic cylinder 22 approaches the end plate 66 or the second end of travel stop. The first receiving region 106 has a third diameter that is greater than the first diameter and that is greater than the second diameter.

The second portion 92 extends at least partially beyond the first cylinder end 52 of the hydraulic cylinder 22. The second portion 92 defines a second opening 110 and a third opening 112. The second opening 110 is disposed between the first cavity 100 and the third opening 112. The second opening 110 has a fourth diameter. The third opening 112 has a fifth diameter that is greater than the fourth diameter and is less than the third diameter.

The first plunger assembly 72 is movably disposed within the first portion 90 of the plug 70. The first plunger assembly 72 is slidably engaged with the first bore 101 of the first cavity 100 that is defined by the first portion 90. The first plunger assembly 72 includes a first plunger 120 and a first pin 122.

The first plunger 120 is movably disposed within the first cavity 100. The first pin 122 is operatively connected to the first plunger 120. The first pin 122 extends from the first plunger 120 and extends through the first plug opening 102.

The first pin 122 defines a first pin opening 123 that extends at least partially through the first pin 122. The first pin 122 is press or slidingly fit into the first plunger 120. The first pin 122 position is automatically set after the first pin 122 engages the first ball screw end 62, after the first cycle of the power steering gear assembly 10. The position of the first pin 122 may remain set at this position during subsequent cycles of the power steering gear assembly 10.

The first plunger assembly 72 is movable between an open position and a closed position. The first plunger 120 is spaced apart from the first valve seat 104 while the first plunger assembly 72 is in the open position in response to the first pin 122 engaging the first ball screw end 62 or the end plate 66 and/or the second end of travel stop. The first plunger 120 is configured to engage the first valve seat 104 while the first plunger assembly 72 is in the closed position in response to or based on the first pin 122 being spaced apart from the first ball screw end 62 or the end plate 66 and/or the second end of travel stop.

The sleeve 74 is configured as a hollow member that is disposed within the third opening 112 of the second portion 92 of the plug 70. The sleeve 74 defines a second cavity 130 having a second bore 131, a sleeve opening 132, and a second valve seat 134. The second cavity 130 is disposed between the sleeve opening 132 and the second opening 110. The second valve seat 134 extends between the second cavity 130 and the sleeve opening 132.

The second plunger assembly 76 is movably disposed within the second portion 92 of the plug 70. The second plunger assembly 76 is slidably engaged with the second bore 131 of the second cavity 130 that is defined by the sleeve 74. The second plunger assembly 76 is disposed in an opposed relationship with the first plunger assembly 72. The second plunger assembly 76 includes a second plunger 140 and the second pin 142.

The second plunger 140 is movably disposed within the second cavity 130. The second pin 142 is operatively connected to the second plunger 140. The second pin 142 extends from the second plunger 140 and extends through the sleeve opening 132. The second pin 142 defines a second pin opening 143 that extends at least partially through the second pin 142. The second pin 142 is press or slidingly fit into the second plunger 140. The second pin 142 position is automatically set after the second pin 142 engages the end wall 32, after the first cycle of the power steering gear assembly 10. The position of the second pin 142 may remain set at this position during subsequent cycles of the power steering gear assembly 10.

The second plunger assembly 76 is movable between an open position and a closed position. The second plunger 140 is spaced apart from the second valve seat 134 while the second plunger assembly 76 is in the open position in response to the second pin 142 engaging the end wall 32 and/or the first end of travel stop. The second plunger 140 is configured to engage the second valve seat 134 while the second plunger assembly 76 is in the closed position in response to or based on the second pin 142 being spaced apart from the end wall 32 and/or the first end of travel stop.

The washer 78 is disposed between the first plunger assembly 72 and the second plunger assembly 76 and is at least partially received within the second opening 110. The washer 78 abuts the first shoulder 114 and abuts the sleeve 74.

Figure 2:
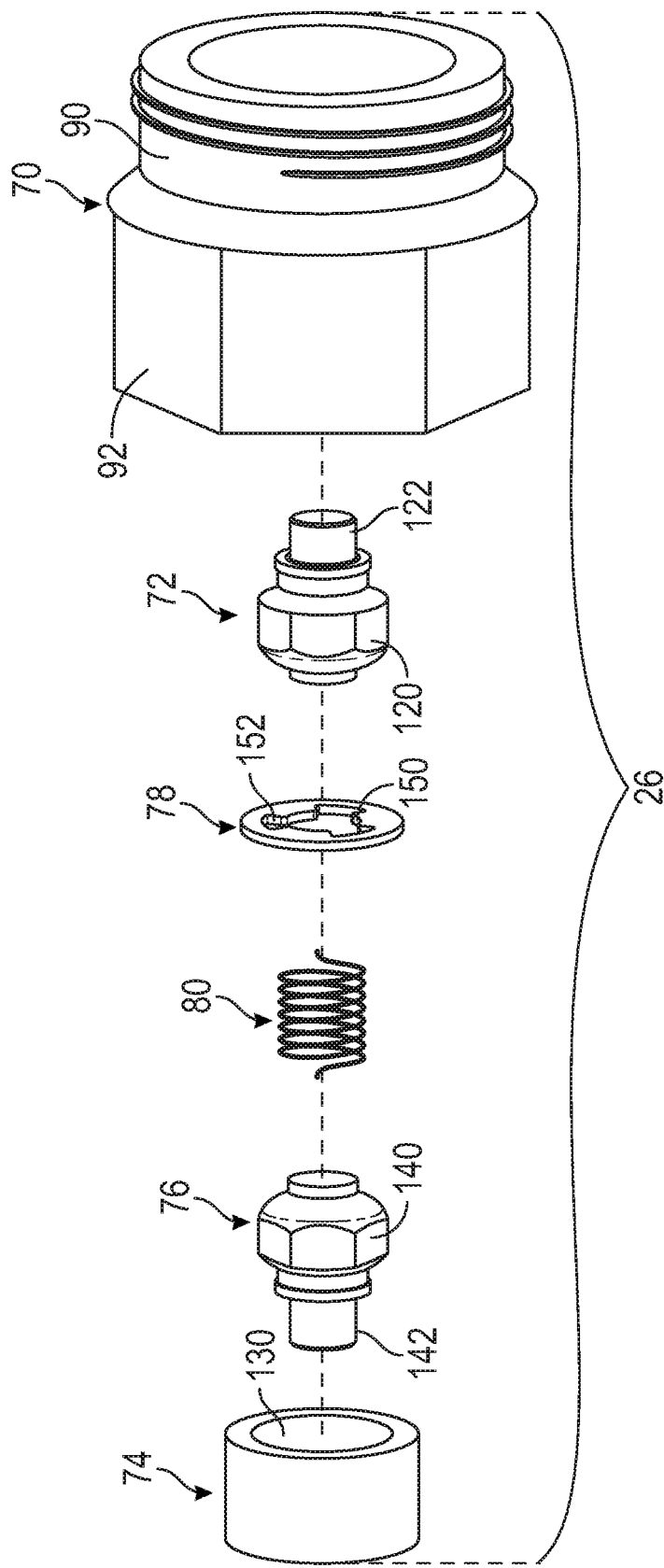
FIG. 2 is a disassembled view of a valve assembly of the power steering gear assembly.

The washer 78 defines a central opening 150. In at least one embodiment, the washer 78 defines another opening 152 that extends from the central opening 150 towards a periphery of the washer 78. As illustrated in FIG. 2, at least three additional openings are provided such that the washer 78 includes a trilobular opening.

The biasing member 80 is disposed between the first plunger assembly 72 and the second plunger assembly 76. The biasing member 80 extends between the first plunger 120 and the second plunger 140 and extends through the central opening 150 of the washer 78. The biasing member 80 is configured to bias each of the first plunger assembly 72 and the second plunger assembly 76 towards their respective closed positions in which the first plunger 120 engages the first valve seat 104 and the second plunger 140 engages the second valve seat 134, respectively.

The end of travel valve assembly 26 defines a bypass flow path 160 through the end of travel valve assembly 26. The bypass flow path 160 facilitates or enables fluid communication between the first chamber 94 and the second chamber 96 through the end of travel valve assembly 26. The bypass flow path 160 is defined by the first plug opening 102 and the first plunger 120, the first cavity 100 and the first plunger 120, at least one of the central opening 150 and the another opening 152 of the washer 78, the second cavity 130 and the second plunger 140, and the sleeve opening 132 and the second plunger 140 while at least one of the first plunger 120 is spaced apart from the first valve seat 104 and the second plunger 140 is spaced apart from the second valve seat 134 in response to the second pin 142 engaging the end wall 32 and/or the first pin 122 engaging the first ball screw end 62.

Figure 3:
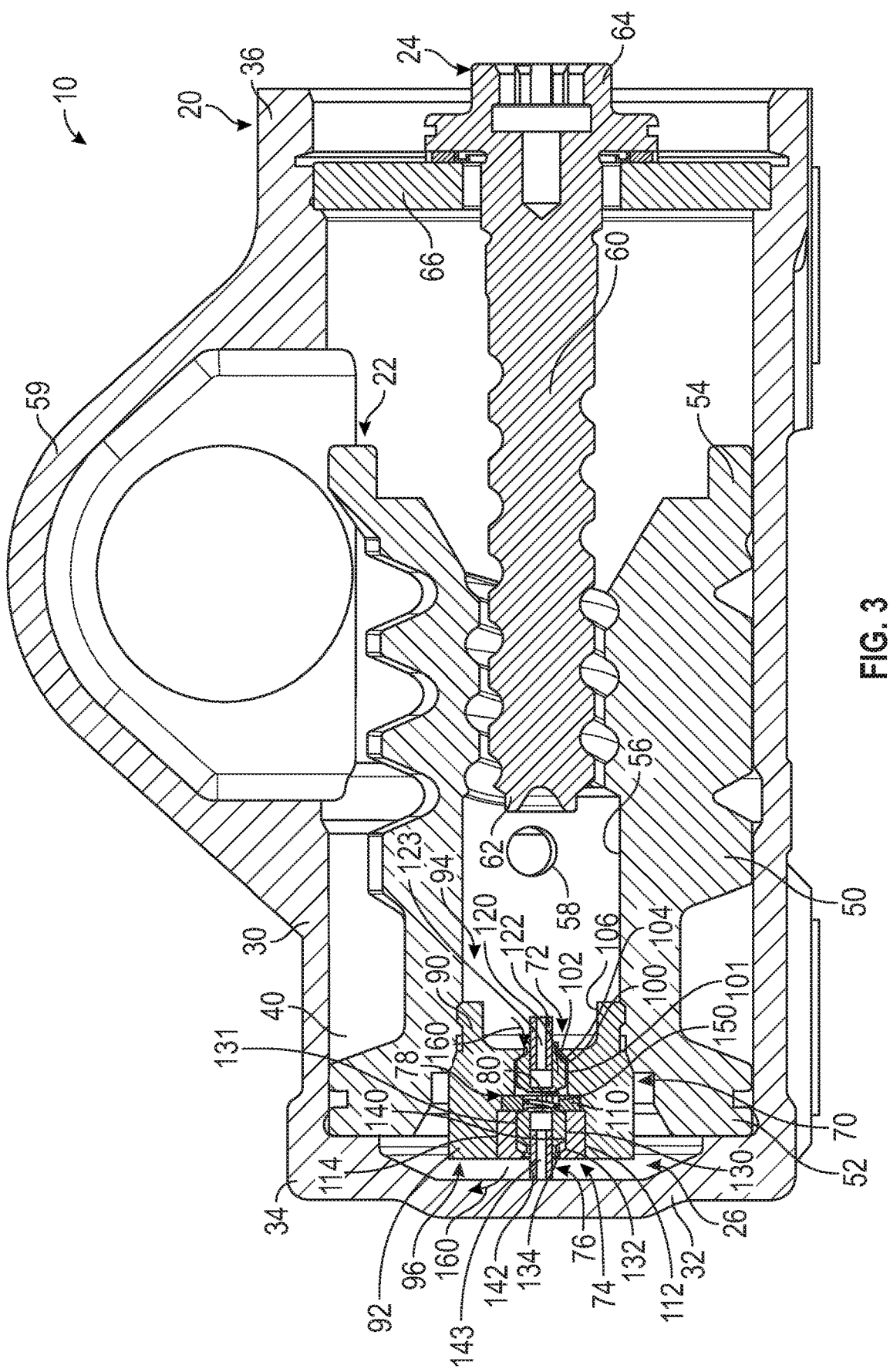
FIG. 3 is a cross-sectional view of the power steering gear assembly at a first end of travel.

As shown in FIG. 3, fluid communication between the first chamber 94 and the second chamber 96 is facilitated through the bypass flow path 160 of the end of travel valve assembly 26 in response to the second pin 142 of the second plunger assembly 76 engaging the end wall 32 to move at least one of the first plunger assembly 72 and the second plunger assembly 76 from the closed position towards the open position. As shown in FIG. 4, fluid communication between the first chamber 94 and the second chamber 96 is facilitated through the bypass flow path 160 of the end of travel valve assembly 26 in response to the first pin 122 of the first plunger assembly 72 engaging the first ball screw end 62 and/or the end plate 66 to move at least one of the first plunger assembly 72 and the second plunger assembly 76 from the closed position towards the open position.

Figure 5:
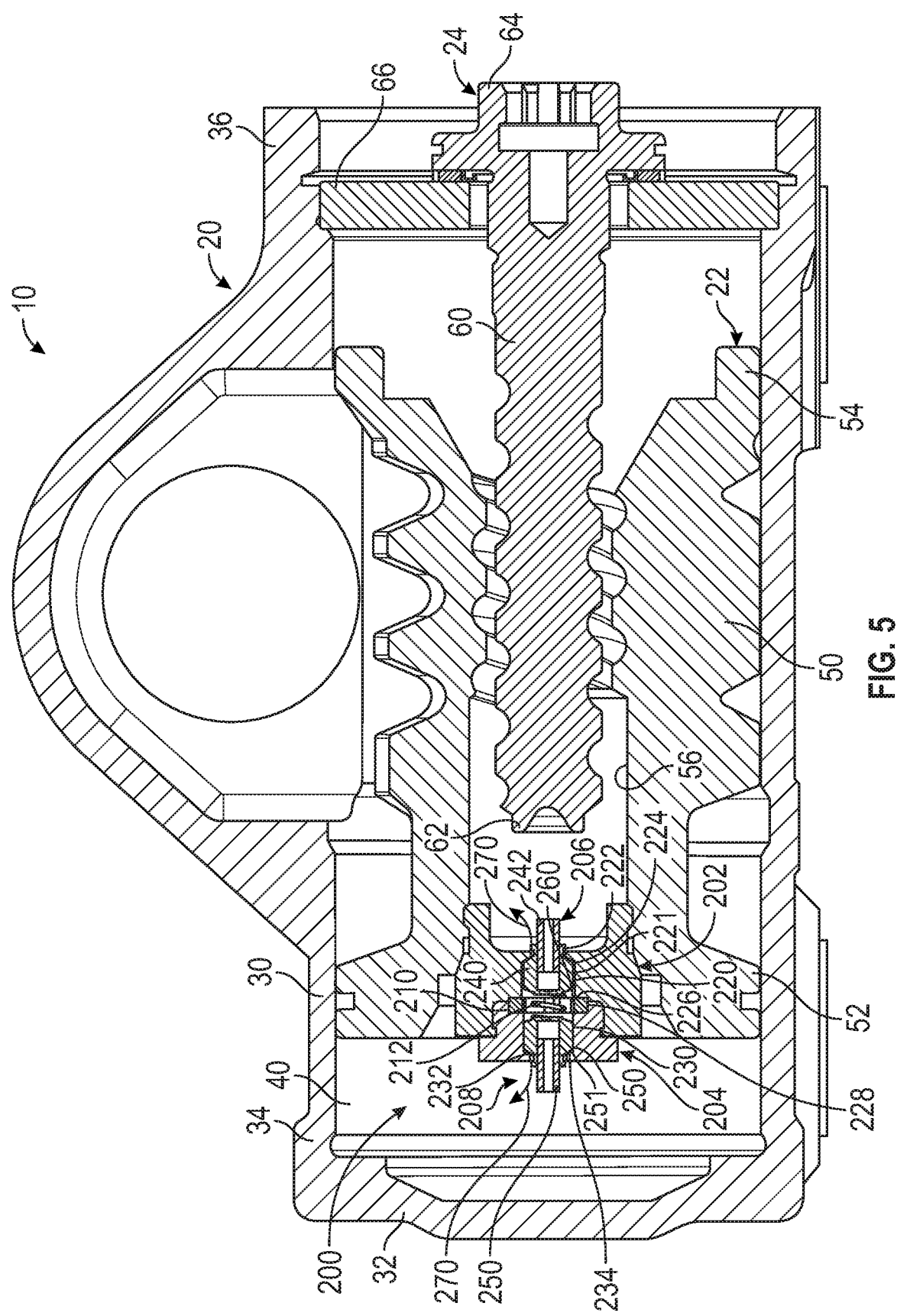
FIG. 5 is a cross-sectional view of a portion of a power steering gear assembly having an alternative valve assembly configuration.

Referring to FIG. 5 a second embodiment of a valve assembly 200 is shown. The valve assembly 200 includes a first plug 202, a second plug 204, a first plunger assembly 206, a second plunger assembly 208, a washer 210, and a biasing member 212.

The first plug 202 is at least partially disposed within and is operatively connected to the first cylinder end 52 of the hydraulic cylinder 22. The first plug 202 defines a first cavity 220, a first opening 222, a first valve seat 224, a first shoulder 226, a second opening 228. The first opening 222 is disposed between the first shoulder 226 and the first valve seat 224. The first valve seat 224 extends between the first cavity 220 and the first opening 222. The first shoulder 226 is disposed between the second opening 228 in the first cavity 220.

The second plug 204 is operatively connected to the first plug 202. The second plug 204 is at least partially received within the second opening 228 of the first plug 202. The second plug 204 defines a second cavity 230, a plug opening 232, and a second valve seat 234. The second cavity 230 is disposed between the plug opening 232 and the second opening 228. The second valve seat 234 extends between the second cavity 230 and the plug opening 232.

The first plunger assembly 206 is movably disposed within the first plug 202. The first plunger assembly 206 is slidably engaged with a first bore 221 of the first cavity 220 of the first plug 202. The first plunger assembly 206 includes a first plunger 240 and a first pin 242. The first plunger 240 is movably disposed within the first cavity 220. The first pin 242 extends from the first plunger 240 and extends through the first opening 222.

The first plunger assembly 206 is movable between an open position in which the first plunger 240 is spaced apart from the first valve seat 224 and a closed position in which the first plunger 240 engages the first valve seat 224. The first plunger assembly 206 is movable between the open position and the closed position in response to the first pin 242 engaging the first ball screw end 62 of the ball screw 24.

The second plunger assembly 208 is movably disposed within the second plug 204. The second plunger assembly 208 is slidably engaged with a second bore 251 of the second plunger 250 of the second plug 204. The second plunger assembly 208 is disposed in an opposed relationship with respect to the first plunger assembly 206. The second plunger assembly 208 includes a second plunger 250 and a second pin 252.

The second plunger 250 is movably disposed within the second cavity 230. The second pin 252 extends from the second plunger 250 and extends through the plug opening 232. The second plunger assembly 208 is movable between an open position in which the second plunger 250 is spaced apart from the second valve seat 234 and a closed position in which the second plunger 250 engages the second valve seat 234. The second plunger assembly 208 is movable between the open position and the closed position in response to the second pin 252 engaging the end wall 32 of the gear housing 20.

The washer 210 is disposed between the first plug 202 and the second plug 204. The washer 210 is disposed within the second opening 228 and is disposed between the first plunger assembly 206 and the second plunger assembly 208. The washer 210 defines a central opening 262.

The biasing member 212 extends between the first plunger 240 of the first plunger assembly 206 and the second plunger 250 of the second plunger assembly 208. The biasing member 212 extends through the central opening 262 of the washer 260. The biasing member 212 is configured to bias the first plunger 240 of the first plunger assembly 206 towards the closed position and into engagement with the first valve seat 224. The biasing member 212 is configured to bias the second plunger 250 of the second plunger assembly 208 towards the closed position and into engagement with the second valve seat 234.

The valve assembly 200 defines a bypass flow path 270 through the valve assembly 200. The bypass flow path 270 facilitates or enables fluid communication between the first chamber 94 and the second chamber 96 through the first plug 202 and the second plug 204 of the valve assembly 200. The bypass flow path 270 is defined by the first opening 222 and the first plunger 240, the first cavity 220 and the first plunger 240, the central opening 262 of the washer 210, the second cavity 230 and the second plunger 250, and the plug opening 232 and the second plunger 250 while at least one of the first plunger 240 is spaced apart from the first valve seat 224 and the second plunger 250 is spaced apart from the second valve seat 234 in response to engagement between the second pin 252 and a steering gear assembly component such as the end wall 32 and/or engagement between the first pin 242 and a steering gear assembly component such as the first ball screw end 62. At least one of the first plunger assembly 206 and the second plunger assembly 208 inhibits fluid communication between the first chamber 94 and the second chamber 96 through the bypass flow path 270 while at least one of the first plunger 240 of the first plunger assembly 206 engages the first valve seat 224 and the second plunger 250 of the second plunger assembly 208 engages the second valve seat 234.

Figure 6:
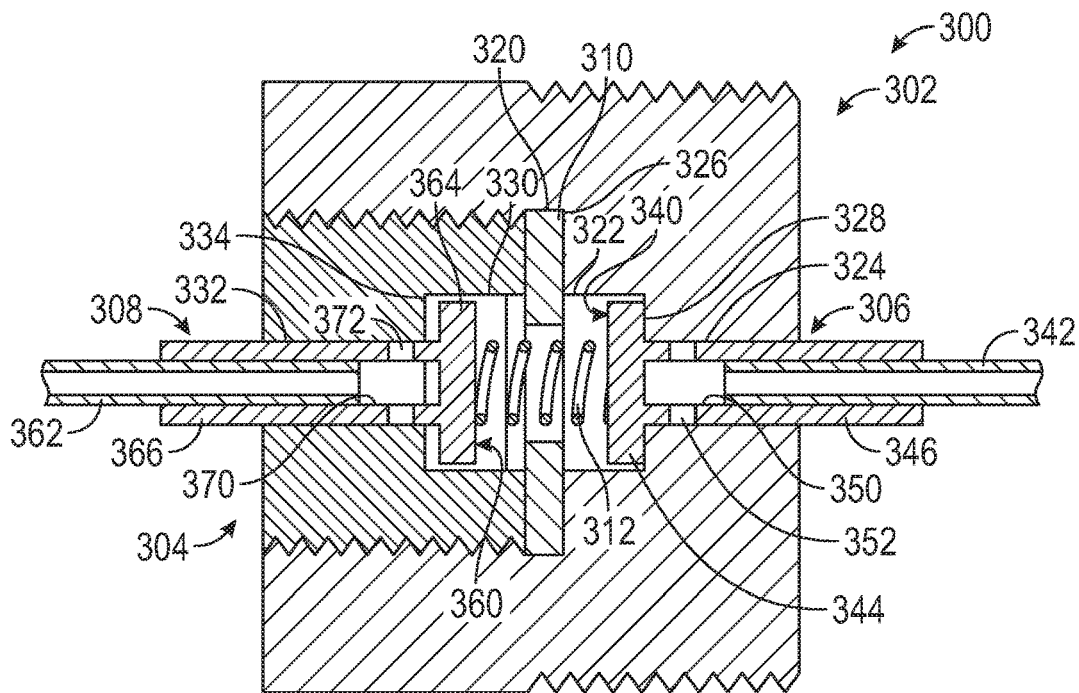
FIG. 6 is a cross-sectional view of a self-setting valve assembly.

Referring to FIG. 6, a self-setting valve assembly 300 according to a third embodiment of the present disclosure, may be at least partially received within the hydraulic cylinder 22 and is disposed at the first cylinder end 52. The self-setting valve assembly 300 includes a first plug 302, a second plug 304, a first plunger assembly 306, a second plunger assembly 308, a washer 310, and a biasing member 312.

The first plug 302 has a first end that extends into and includes an externally threaded portion that engages an internally threaded portion of the bore 56 of the hydraulic cylinder 22. The first plug 302 defines a first plug first cavity 320, a first plug second cavity 322, and a first bore 324.

The first plug first cavity 320 extends from a second end of the first plug 302 that is disposed opposite the first end towards the first end of the first plug 302 and terminates at an end wall 326. The first plug first cavity 320 may be provided with a plurality of threads or at least one groove that is arranged to receive a retaining ring.

The first plug second cavity 322 extends from the end wall 326 towards a first valve seat 328. The first plug second cavity 322 is disposed between the first plug first cavity 320 and the first bore 324.

The first bore 324 extends from the first end of the first plug 302 towards the second end of the first plug 302. The first bore 324 terminates at the first valve seat 328 such that the first valve seat 328 is disposed between the first bore 324 and the first plug second cavity 322.

The second plug 304 is at least partially received within the first plug first cavity 320 of the first plug 302. The second plug 304 defines a second plug first cavity 330 and a second bore 332.

The second plug first cavity 330 extends from a first end of the second plug 304 towards a second end that is disposed opposite the first end and terminates at a second valve seat 334. The second end of the second plug 304 is disposed substantially flush with the second end of the first plug 302 such that the second plug 304 is completely disposed within the first plug 302.

The second bore 332 extends from the second end of the second plug 304 towards the first end of the second plug 204. The second bore 332 terminates at the second valve seat 334 such that the second valve seat 334 is disposed between the second plug first cavity 330 and the second bore 332.

The first plunger assembly 306 is movably disposed within the first plug 302. The first plunger assembly 306 includes a first plunger 340 and a first pin 342.

The first plunger 340 is provided with a first head 344 and a first stem 346 that extends from the first head 344. The first head 344 is disposed within the first plug second cavity 322 and may selectively engage the first valve seat 328. There is clearance between the first head 344 and the first plug second cavity 322. The first stem 346 extends from the first head 344 and into and through the first bore 324. The first stem 346 defines a first stem bore 350 and a first stem port 352. The first stem bore 350 extends from an end of the first stem 346 towards the first head 344. The first stem port 352 is disposed proximate the first head 344 and extends through the first stem 246. The first stem port 352 is fluidly connected to the first stem bore 350 to enable a fluid flow through the first plunger 340 while the first plunger assembly 306 is in an open position.

The first pin 342 is slidably received within the first stem bore 350 and spaced apart from the first stem port 352. A position of the first pin 342 relative to the first head 344 is automatically set after the first pin 342 engages the first ball screw end 62, after the first cycle of the power steering gear assembly 10.

The first plunger assembly 306 is movable between an open position in which the first head 344 is spaced apart from the first valve seat 328 and a closed position in which the first head 344 engages the first valve seat 328.

The second plunger assembly 308 is movably disposed within the second plug 304. The second plunger assembly 308 is disposed in an opposing relationship with respect to the first plunger assembly 306. The second plunger assembly 308 includes a second plunger 360 and a second pin 362.

The second plunger 360 is provided with a second head 364 and a second stem 366 that extends from the second head 364. The second head 364 is disposed within the second plug first cavity 330 and may selectively engage the second valve seat 334. There is clearance between the second head 364 and the second plug first cavity 330. The second stem 366 extends from the second head 364 and into and through the second bore 332. The second stem 366 defines a second stem bore 370 and a second stem port 372. The second stem bore 370 extends from an end of the second stem 366 towards the second head 364. The second stem port 372 is disposed proximate the second head 364 and extends through the second stem 366. The second stem port 372 is fluidly connected to the second stem bore 370 to enable a fluid flow through the second plunger 360 while the second plunger assembly 308 is in an open position.

The second pin 362 is slidably received within the second stem bore 370 and spaced apart from the second stem port 372. A position of the second pin 362 relative to the second head 364 is automatically set after the second pin 362 engages the end wall 32, after the first cycle of the power steering gear assembly 10.

The second plunger assembly 308 is movable between an open position in which the second head 364 is spaced apart from the second valve seat 334 and a closed position in which the second head 364 engages the second valve seat 334.

The washer 310 is disposed between the first plunger assembly 306 and the second plunger assembly 308 and is received within the first plug first cavity 320. The washer 310 engages the end wall 326. The washer 310 may have a substantially similar configuration as the washer 78 having a tri-lobular opening.

The biasing member 312 extends between the first head 344 of the first plunger assembly 306 and the second head 364 of the second plunger assembly 308. The biasing member 312 extends through the central opening of the washer 310 and is configured to bias the first head 344 of the first plunger assembly 306 towards engagement with the first valve seat 328 and is configured to bias the second head 364 of the second plunger assembly 308 towards engagement with the second valve seat 334.

Figure 7A:
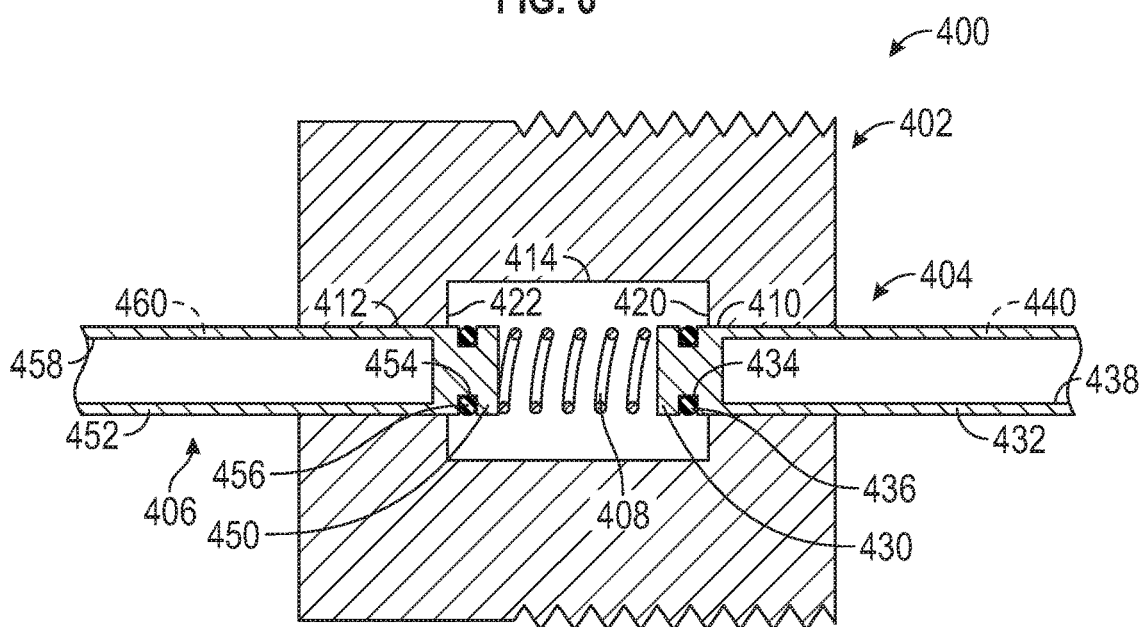
FIG. 7A is a cross-sectional view of a self-setting valve assembly.

Referring to FIG. 7A, a self-setting valve assembly 400 according to a fourth embodiment of the present disclosure, may be at least partially received within the hydraulic cylinder 22 and is disposed at the first cylinder end 52. The self-setting valve assembly 400 includes a plug 402, a first plunger 404, a second plunger 406, and a biasing member 408.

The plug 402 has a first end that extends into and includes an externally threaded portion that engages an internally threaded portion of the bore 56 of the hydraulic cylinder 22. The plug 402 defines a first bore 410, a second bore 412, and a cavity 414.

The first bore 410 extends from a first end of the plug 402 towards a second end of the plug 402 that is disposed opposite the first end. The first bore 410 extends from the first end and terminates at a first end wall 420. The first bore 410 extends into the cavity 414.

The second bore 412 extends from the second end of the plug 402 towards the first end. The second bore 412 extends from the second end and terminates at a second end wall 422. The second bore 412 extends into the cavity 414.

The cavity 414 is disposed between the first bore 410 and the second bore 412. The cavity 414 is disposed between the first end wall 420 and the second end wall 422 such that the first bore 410 and the second bore 412 each extend into the cavity 414.

The first plunger 404 is slidably received within the first bore 410 and extends into the cavity 414. The first plunger 404 includes a first head 430 and a first stem 432. The first head 430 is at least partially disposed within the cavity 414. The first head 430 defines a first retaining groove 434 that extends about the first head 430. A first retainer 436 such as a snap ring retainer is at least partially received within the first retaining groove 434 and is arranged to selectively engage the first end wall 420. The first stem 432 extends from the first head 430 and into and through the first bore 410. The first stem 432 defines a first stem bore 438 and a first flow channel 440. The first stem bore 438 extends from an end of the first stem 432 towards the first head 430.

Figure 7B:
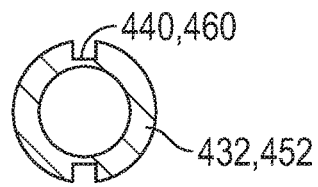
FIG. 7B is an end view of a valve pin of the self-setting valve assembly.

Referring to FIG. 7B, the first flow channel 440 extends along a length of an external surface of the first plunger 404. The first flow channel 440 radially extends from an external surface of the first plunger 404 towards the first stem bore 438. The first flow channel 440 axially extends from an end of the first stem 432 and towards the first retaining groove 434 of the first head 430. The first flow channel 440 enables a fluid flow about a portion of the first plunger 404 while the first plunger 404 is in an open position. In at least one embodiment an additional flow channel is circumferentially spaced apart from the first flow channel 440.

Referring to FIG. 7A, the second plunger 406 is disposed in an opposing relationship relative to the first plunger 404. The second plunger 406 is slidably received within the second bore 412 and extends into the cavity 414. The second plunger 406 includes a second head 450 and a second stem 452. The second head 450 is at least partially disposed within the cavity 414. The second head 450 defines a second retaining groove 454 that extends about the second head 450. A second retainer 456 such as a snap ring retainer is at least partially received within the second retaining groove 454 and is arranged to selectively engage the second end wall 422. The second stem 452 extends from the second head 450 and into and through the second bore 412. The second stem 452 defines a second stem bore 458 and a second flow channel 460. The second stem bore 458 extends from an end of the second stem 452 towards the second head 450.

Referring to FIG. 7B, the second flow channel 460 extends along a length of an external surface of the second plunger 406. The second flow channel 460 radially extends from an external surface of the second plunger 406 towards the second stem bore 458. The second flow channel 460 axially extends from an end of the second stem 452 and towards the second retaining groove 454 of the second head 450. The second flow channel 460 enables a fluid flow about a portion of the second plunger 406. In at least one embodiment, an additional flow channel is circumferentially spaced apart from the second flow channel 460.

Referring to FIG. 7A, the biasing member 408 is disposed within the cavity 414 and extends between the first head 430 and the second head 450. The biasing member is arranged to bias the first plunger 404 away from the second plunger 406 such that the first retainer 436 is biased towards engagement with the first end wall 420 and such that the second retainer 456 is biased towards engagement with the second end wall 422.

Figure 8:
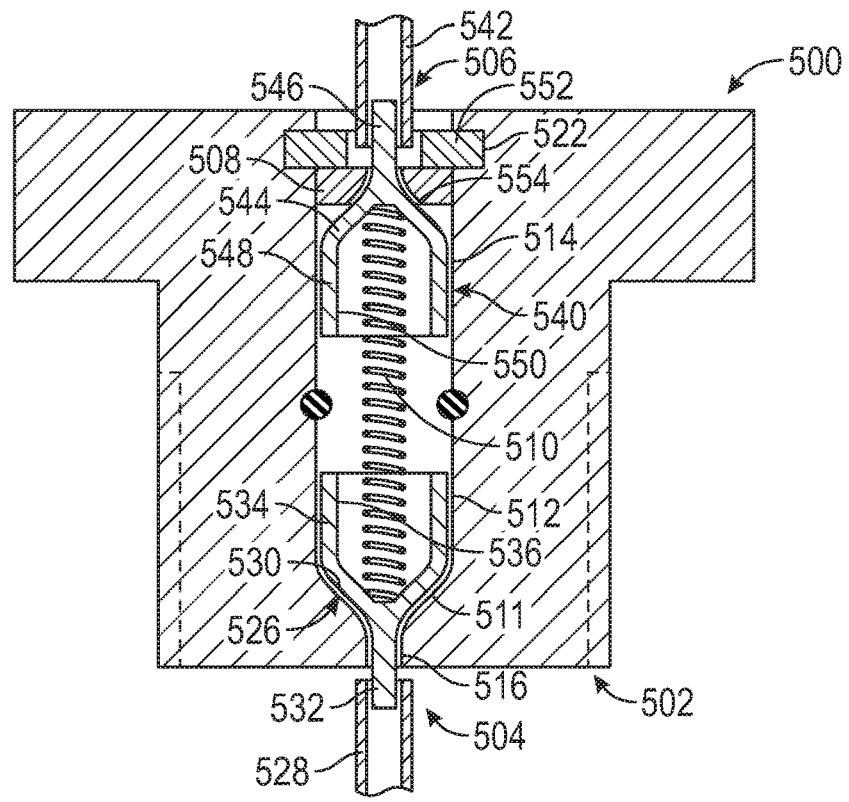
FIG. 8 is a cross-sectional view of a self-setting valve assembly.

Referring to FIG. 8, a self-setting valve assembly 500 according to a fifth embodiment of the present disclosure, may be at least partially received within the hydraulic cylinder 22 and is disposed at the first cylinder end 52. The self-setting valve assembly 500 includes a plug 502, a first plunger assembly 504, a second plunger assembly 506, a washer 508, and a biasing member 510.

The plug 502 has a first end that extends into and includes an externally threaded portion that engages an internally threaded portion of the bore 56 of the hydraulic cylinder 22. The first end of the plug 502 defines a first valve seat 511 having a chamfered surface. The plug 502 defines a cavity that extends from a second end of the plug 502 towards the first end of the plug 502 and terminates at the first valve seat 511. The cavity may be divided into a first cavity 512 and a second cavity 514. The plug 502 further defines a first bore 516.

Figure 9:
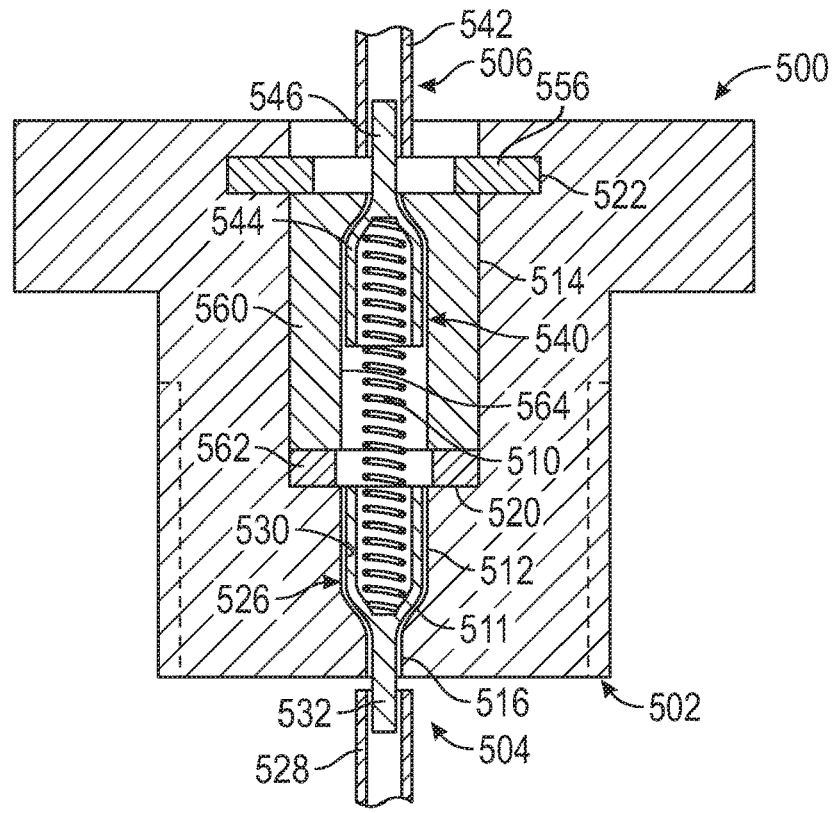
FIG. 9 is a cross-sectional view of a self-setting valve assembly.

The first cavity 512 extends from the first valve seat 511 proximate the first end of the plug 502 towards a second end of the plug 502 that is disposed opposite the first end. The first cavity 512 may terminate at an end wall 520, as shown in FIG. 9.

The second cavity 514 extends from the second end of the plug 502 to the first cavity 512 and terminates at the end wall 520. The second cavity 514 defines a retaining groove 522 that is disposed proximate the second end of the plug 502. The second cavity 514 may have a diameter or cross-sectional form that is substantially equal to a diameter or cross-sectional form of the first cavity 512, as shown in FIG. 8.

The plug 502 may include a pair of shoulders or a rim that extends about the second end of the plug 502.

The first bore 516 extends from the first end of the plug 502 towards the first valve seat 511 and extends to the first cavity 512.

The first plunger assembly 504 is movably disposed within the first cavity 512 of the plug 502 and is disposed proximate the first end of the plug 502. The first plunger assembly 504 includes a first plunger 526 and a first sleeve 528.

The first plunger 526 is provided with a first head 530 and a first stem 532. The first head 530 is disposed within the first cavity 512. There is clearance between the first head 530 and the first cavity 512. The first head 530 may be provided with or include a circumferential wall 534 defining a first cup 536. The first stem 532 extends from the first head 530 and into and through the first bore 516.

The first sleeve 528 is disposed about the first stem 532. The first sleeve 528 may be press fit onto the first stem 532.

The second plunger assembly 506 is movably disposed within the second cavity 514 of the plug 502 and is disposed proximate the second end of the plug 502. The second plunger assembly 506 includes a second plunger 540 and a second sleeve 542.

The second plunger 540 is provided with a second head 544 and the second stem 546. The second head 544 is disposed within the second cavity 514. There is clearance between the second head 544 and the second cavity 514. The second head 544 may be provided with or include a circumferential wall 548 defining a second cup 550. The second stem 546 extends from the second head 544 towards and extends beyond the second end of the plug 502.

The second head 544 of the second plunger 540 may be retained within the second cavity 514 by the washer 508 that is positioned within the second cavity 514. The washer 508 defines an opening through which the second stem 546 may extend. The washer 508 defines a chamfered portion that extends into the opening that defines a second valve seat 554.

The washer 508 may be retained within the second cavity 514 by a retainer 552 that is at least partially received within the retaining groove 522. The retainer 552 engages the washer 508 and is arranged to take up any axial lash to help seat the washer 508.

The second sleeve 542 is disposed about the first stem 532. The second sleeve 542 may be press fit onto the second stem 546.

The biasing member 510 extends between the first plunger assembly 504 and the second plunger assembly 506. A first end of the biasing member 510 is received within the first cup 536 of the first head 530 and a second end of the biasing member 510 is received within the second cup 550 of the second head 544. The biasing member 510 is arranged to bias the first head 530 of the first plunger assembly 504 towards engagement with the first valve seat 511 and is arranged to bias the second head 544 of the second plunger assembly 506 towards engagement with the second valve seat 554.

Referring to FIG. 9, the second cavity 514 may have a diameter or cross-sectional form that is greater than a diameter or cross-sectional form of the first cavity 512. In such an embodiment, a sleeve 560 may be disposed within the second cavity 514. The sleeve 560 may be press fit or slip fit into the second cavity 514. The sleeve 560 may be retained within the second cavity 514 by a washer 562 that is disposed within the second cavity 514 and is disposed at and engages a first end of the sleeve 560 and the end wall 520. The sleeve 560 may be retained within the second cavity 514 by the retainer 556 that is disposed at and engages a second end of the sleeve 560.

The sleeve 560 defines a sleeve bore 564 that extends between the first end and the second end of the sleeve 560. The sleeve bore 564 terminates at a second valve seat that is defined at the second end of the sleeve 560 having a substantially similar configuration as the second valve seat 554. The second head 544 is disposed within and spaced apart from the sleeve bore 564 and the second stem 546 extends through an opening that is defined by the second valve seat of the sleeve 560.

Figure 10:
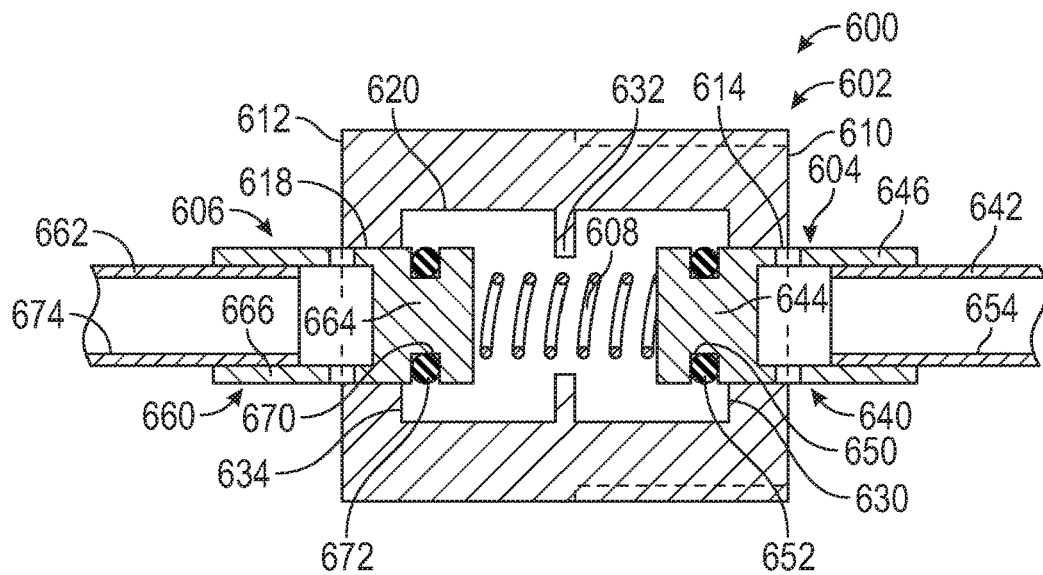
FIG. 10 is a cross-sectional view of a self-setting valve assembly.

Referring to FIG. 10, a self-setting valve assembly 600 according to a sixth embodiment of the present disclosure, may be at least partially received within the hydraulic cylinder 22 and is disposed at the first cylinder end 52. The self-setting valve assembly 600 includes a plug 602, a first plunger assembly 604, a second plunger assembly 606, and a biasing member 608.

The plug 602 extends between a first end 610 and a second end 612. The plug 602 may include an externally threaded portion that is disposed proximate the first end 610 that engages an internally threaded portion of the bore 56 of the hydraulic cylinder 22. The plug 602 defines a cavity, a first bore 614, and a second bore 618.

The cavity is disposed between the first end 610 and the second end 612. The cavity is divided into a first cavity 616 and a second cavity 620 by a pair of shoulders 632 that extend inwardly towards a central longitudinal axis of the plug 602. The pair of shoulders 632 are spaced apart from each other such that an opening or passageway extends or is defined between the pair of shoulders 632.

The first bore 614 extends from the first end 610 towards the second end 612 to the first cavity 616. The first bore 614 terminates at a first end wall 630. The first cavity 616 extends between the first end wall 630 and the pair of shoulders 632. The first cavity 616 is disposed between the first bore 614 and the second cavity 620.

The second bore 618 extends from the second end 612 towards the first end 610 to the second cavity 620. The second bore 618 terminates at a second end wall 634. The second cavity 620 extends between the second end wall 634 and the pair of shoulders 632 of the plug 602. The second cavity 620 is separated from the first cavity 616 by the pair of shoulders 632. The second cavity 620 is disposed between the second bore 618 and the first cavity 616.

The first plunger assembly 604 is movably disposed within the plug 602. The first plunger assembly 604 includes a first plunger 640 and a first pin 642.

The first plunger 640 is provided with a first head 644 and a first stem 646 that extends from the first head 644. The first head 644 is disposed within the first cavity 616. An end of the first head 644 may be provided with a notch or a recess. The first head 644 defines a first retaining groove 650 that is disposed about the first head 644 and is arranged to receive a retaining member 652 such as a snap ring. The first retaining groove 650 may be provided with a chamfer that provides a lead in so that the retaining member 652 may be more easily installed onto the first plunger 640.

Figure 11:
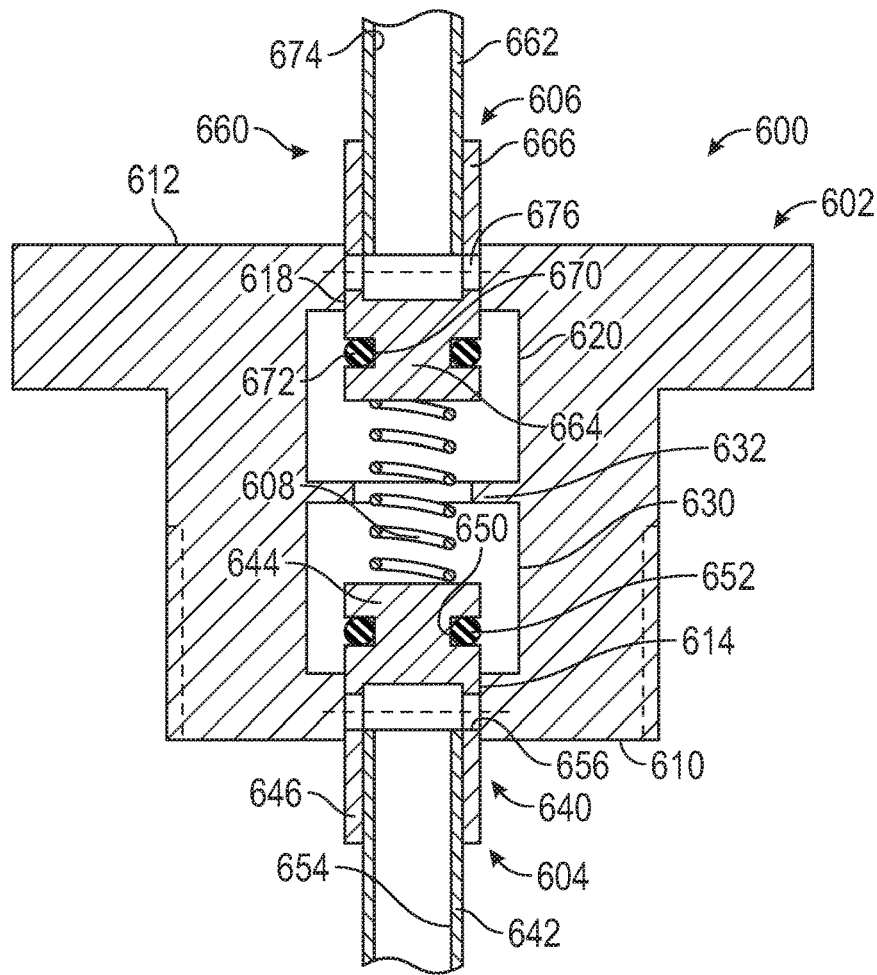
FIG. 11 is a cross-sectional view of a self-setting valve assembly.

The first stem 646 extends from the first head 644 and into and through the first bore 614. The first stem 646 defines a first stem bore 654 that extends from an end of the first stem 646 towards the first head 644. As shown in FIG. 11, the first stem 646 may define a first stem port 656 that is disposed proximate the first head 644 and extends through the first stem 646. The first stem port 656 is fluidly connected to the first stem bore 654 and is spaced apart from the first retaining groove 650. The first stem port 656 and the first stem bore 654 enable a fluid flow through the first plunger 640 while the first plunger assembly 604 is in an open position.

The first pin 642 is slidably received within the first stem bore 654 and is spaced apart from the first stem port 656. A position of the first pin 642, relative to the first head 644, is automatically set after the first pin 642 engages the first ball screw end 62 after the first cycle of the power steering gear assembly 10.

The first plunger assembly 604 is movable between an open position in which the retaining member 652 is spaced apart from the first end wall 630 and a closed position in which the retaining member 652 engages the first end wall 630.

The second plunger assembly 606 is movably disposed within the plug 602 and is disposed in an opposing relationship with respect to the first plunger assembly 604. The second plunger assembly 606 includes a second plunger 660 and a second pin 662.

The second plunger 660 is provided with a second head 664 and a second stem 666 that extends from the second head 664. The second head 664 is disposed within the second cavity 620. An end of the second head 664 may be provided with a notch or a recess. The second head 664 defines a second retaining groove 670 that is disposed about the second head 664 and is arranged to receive a retaining member 672 such as a snap ring. The second retaining groove 670 may be provided with a chamfer that provides a lead in so that the retaining member 672 may be more easily installed onto the second plunger 660.

The second stem 666 extends from the second head 664 and into and through the second bore 618. The second stem 666 defines a second stem bore 674 that extends from an end of the second stem 666 towards the second head 664. As shown in FIG. 11, the second stem 666 may define a second stem port 676 that is disposed proximate the second head 664 and extends through the second stem 666. The second stem port 676 is fluidly connected to the second stem bore 674 and is spaced apart from the second retaining groove 670. The second stem port 676 and the second stem bore 674 enable a fluid flow through the second plunger 660 while the second plunger assembly 606 is in an open position.

The second pin 662 is slidably received within the second stem bore 674 and is spaced apart from the second stem port 676. A position of the second pin 662, relative to the second head 664, is automatically set after the second pin 662 engages the end wall 32 after the first cycle of the power steering gear assembly 10.

The second plunger assembly 606 is movable between an open position in which the retaining member 672 is spaced apart from the second end wall 634 and a closed position in which the retaining member 672 engages the second end wall 634.

As shown in FIGS. 10 and 11, the biasing member 608 extends between and engages the first head 644 and the second head 664. The biasing member 608 extends through the opening a passageway that is defined between the pair of shoulders 632 of the plug 602. The biasing member 608 is arranged to bias the first plunger assembly 604 and the second plunger assembly 606 towards their respective closed positions.

As shown in FIG. 11, the second end 612 of the plug 602 may include a pair of shoulders or a rim that extends about the second end 612.

The valve assemblies disclosed herein simplify end of travel valve assemblies while also improving the overall performance and function of end of travel valve assemblies. These end of travel valve assemblies improve product reliability by compensating for dimensional variations of power steering gear assembly components that may impact the pressure unloading valve actuation while also effectively controlling fluid leakage paths.

Throughout this specification, the term "attach," "attachment," "connected", "coupled," "coupling," "mount," or "mounting" shall be interpreted to mean that a structural component or element is in some manner connected to or contacts another element, either directly or indirectly through at least one intervening structural element, or is integrally formed with the other structural element.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A self-setting valve assembly for a power steering gear assembly, the valve assembly comprising:
    a first plug extending between a first end and a second end, the first plug defining a first plug first cavity that extends from the second end towards the first end, a first bore that extends from the first end towards the second end, and a first plug second cavity that extends between the first plug first cavity and the first bore;
    a second plug that is received within the first plug first cavity, the second plug defining a second plug first cavity and a second bore;
    a first plunger having a first head disposed within the first plug second cavity and a first stem extending from the first head and through the first bore;
    a second plunger having a second head disposed within the second plug first cavity and a second stem that extends from the second head and through the second bore; and
    a washer received within the first plug first cavity and disposed between the first plunger and the second plunger, the washer defining a central opening and another opening that extends from the central opening towards a periphery of the washer.

2. The self-setting valve assembly of claim 1, wherein the first stem defines a first stem port that extends through the first stem.

3. The self-setting valve assembly of claim 2, wherein the first stem defines a first stem bore that extends from an end of the first stem towards the first head.

4. The self-setting valve assembly of claim 3, further comprising:
    a first pin slidably received within the first stem bore and spaced apart from the first stem port.

5. The self-setting valve assembly of claim 1, wherein the second stem defines a second stem port that extends through the second stem.

6. The self-setting valve assembly of claim 5, wherein the second stem defines a second stem bore that extends from an end of the second stem towards the second head.

7. The self-setting valve assembly of claim 6, further comprising:
    a second pin slidably received within the second stem bore and spaced apart from the second stem port.

8. The self-setting valve assembly of claim 1, further comprising:
    a biasing member extending between the first plunger and the second plunger and through the central opening of the washer.

9. The self-setting valve assembly of claim 1, wherein an end of the second plug is disposed flush with the second end of the first plug.

* * * * *